Jan. 23, 1962   M. FREIST   3,017,862
CONTROL VALVE ASSEMBLY FOR FLUID OPERATED SYSTEMS
Filed July 22, 1960   2 Sheets-Sheet 1

INVENTOR:
MANFRED FREIST
BY
Michael S. Striker
his ATTORNEY

INVENTOR:
MANFRED FREIST
BY Michael S. Striker
his ATTORNEY

United States Patent Office 3,017,862
Patented Jan. 23, 1962

3,017,862
CONTROL VALVE ASSEMBLY FOR FLUID
OPERATED SYSTEMS
Manfred Freist, Karl-Marx-Stadt, Germany, assignor to
VEB Industriewerke Karl-Marx-Stadt, Karl-Marx-
Stadt, Germany
Filed July 22, 1960, Ser. No. 44,785
2 Claims. (Cl. 121—41)

The present invention relates to a valve assembly which is adapted to control the movements of fluid operated systems, such as hydraulic motors, hydraulic control devices, and the like. The improved control valve assembly is particularly suited for use in steering mechanisms of airplanes and many other types of conveyances.

An important object of the invention is to provide a very simple, compact, lightweight and reliable control valve assembly which is adapted to control and to trigger the movements of a fluid operated system into a large number of selected positions, and which may be readily combined with nearly all types of fluid operated systems, such as hydraulic or pneumatic motors and the like.

Another object of the invention is to provide a control valve assembly of the above outlined characteristics which may be mounted directly on or in the controlled fluid operated system and which may be operatively connected with the fluid operated system in a very simple and convenient manner.

A further object of the instant invention is to provide a control valve assembly for hydraulic motors and the like which is constructed, assembled and connected with the hydraulic motor it controls in such a way that it automatically shuts off the supply of pressure fluid when the movable component or components of the hydraulic motor reach a predetermined position.

An additional object of the invention is to provide a control valve assembly of the above outlined characteristics which is equally useful to control the operation of fluid motors regardless of whether the motors must perform very long or very short working strokes.

A concomitant object of the invention is to provide a valve assembly of the above described type which is equally useful in connection with hydraulically or pneumatically operated fluid motors.

With the above objects in view, the invention resides in the provision of a control valve assembly which comprises essentially a housing reciprocably receiving a first and a second valve member, these valve members being yieldably coupled to each other by means of a tensioned resilient element which constantly tends to move the same into a given position, the second valve member being operatively connected with one or more movable components of the fluid operated system, e.g. with the rod of a piston which is reciprocable in a double-acting cylinder. The valve assembly further comprises a source of pressure fluid, e.g. a fluid reservoir and a hydraulic pump or an air compressor, a system of conduits and lines, channels, bores and ports, as well as a distributor valve which is adapted to steer the flow of fluid to and from the valve assembly in such a way that the first valve member will selectively admit or shut off the flow of fluid to the fluid operated system, depending upon the momentary position of the distributor valve and also upon the position of the second valve member which latter is compelled to move with one or more components of the fluid operated system. The second valve member may but need not be directly coupled with a component of the fluid operated system; for example, it may be connected thereto by means of a step-up or a step-down transmission, such as a cam follower, a bell crank lever, a simple two-armed lever or in any other suitable way so that the length of its movements may equal, exceed or be less than the length of movements performed by the corresponding component or components of the fluid operated system.

The resilient element is preferably received in a blind bore formed in the first valve member and engages with a coaxial extension of the second valve member. The extension preferably projects into the blind bore to reduce the overall length of the valve housing. The two valve members define two communicating pressure chambers and their end faces turned toward the respective chambers are preferably of the same area so that any axial movements of the second valve member may bring about equal axial movements of the first valve member. The valve members further define therebetween an annular compartment which may receive pressure fluid to move the first valve member away from the second valve member, or the pressure chamber adjacent to the first valve member may be connected with the pressure source so that the first valve member is moved against the bias of the aforementioned resilient element and toward the second valve member. During such movements, the first valve member exposes suitably spaced bores which permit the flow of pressure fluid to one side of the fluid operated system and the discharge of pressure fluid from the other side of the fluid operated system, or vice versa.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, in which:

Figure 1:
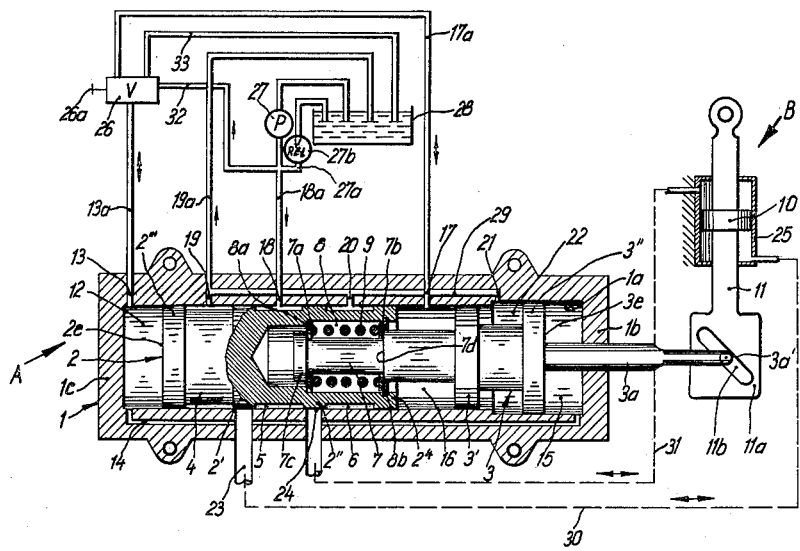
FIG. 1 is an axial section through a hydraulic control valve assembly in a position corresponding to the central position of a controlled fluid operated system in the form of a schematically illustrated hydraulic motor which is operatively coupled with the control assembly.

Referring now in greater detail to the illustrated embodiment, and first to FIG. 1, there is shown a hydraulic control valve assembly A which comprises a valve housing 1 formed with a cylindrical bore 1a receiving a first valve member in the form of a four-flange spool 2 and a second valve member in the form of a two-flange spool 3. Both valve members are reciprocable in the bore 1a in the axial direction of the valve housing 1. The periphery of the left-hand valve member 2 is formed with three spaced annular recesses 4, 5, 6 and with a coaxial blind bore 8 which extends inwardly from the right-hand end face of the flange $2^4$ to receive a coaxial extension 7 of the valve member 3. The extension 7 is constantly biased into the position of FIG. 1 by a helical expansion spring 9 which operates between two loosely mounted ring-shaped stop members 7a, 7b, the stop member 7a normally abutting against the head 7c of extension 7 and against an internal shoulder 8a in the bore 8. The other stop member 7b abuts against a snap ring 8b which is inserted into a coaxial annular groove formed in the wall of bore 8. When the valve member 2 is shifted with respect to the valve member 3 in a direction to the right, the shoulder 8a entrains the stop member 7a in a direction away from the head 7c and the stop member 7b compresses the spring 9 by moving away from the snap ring 8b under the action of a shoulder 7d on the extension 7 (see FIG. 2). On the other hand, when the valve member 2 moves in a direction away from the valve member 3, the spring 9 is compressed by the right-hand stop member 7b which is entrained by the snap ring 8b away from the shoulder 7d while the left-hand stop member 7a remains in abutment with the head 7c (see FIG. 3). Thus, the valve members 2, 3 are axially shiftable with respect to each other under or against the bias of the resilient element 9 which latter constantly tends to maintain the valve members in the position of FIG. 1.

The right-hand valve member 3 is formed with a coaxial stem 3a which extends through the right-hand end wall 1b of the valve housing 1 and carries at its free end a follower members 3a' slidably received in an inclined cam slot 11b formed in the enlarged end portion 11a of a movable component in the form of a piston rod 11. The piston rod 11 is connected with a piston 10 which is reciprocably received in a cylinder 25, this cylinder and the piston 10 constituting a hydraulic motor B which is controlled by the valve assembly A.

The left-hand end wall 1c of the housing 1 and the left-hand flange 2''' of the valve member 2 define a pressure chamber 12, and a similar pressure chamber 15 is formed between the right-hand end wall 1b and the right-hand flange 2'' of the valve member 3. The chamber 12 communicates wtih a radial port 13 and wtih a conduit 13a leading to a distributor valve 26 whose purpose will be explained in greater detail hereinafter. The body of the valve housing 1 is formed with a connecting channel 14 which permits communication of fluid between the chambers 12 and 15. The end faces 2e, 3e of valve member 2, 3 which are turned toward the chambers 12, 15, respectively, are of equal area. The flanges 2⁴, 3' of the valve members 2, 3 define therebetween an annular compartment 16 which communicates with a radial port 17 and with a conduit 17a leading to the distributor valve 26. The aforementioned annular recess 5 communicates with a radial inlet port 18 and with a pressure conduit 18a which leads to a pressure source in the form of a hydraulic pump 27 adapted to draw oil from a source here shown as a reservoir 28. The pressure side of the pump 27 is connected with an overflow conduit 27a which leads to the reservoir 28 and contains a pressure relief valve 27b. The annular recesses 4, 6 communicate with radial outlet ports 19, 20, respectively which lead pressure fluid to a collecting channel 29, this channel also communicating with a further outlet port 21 which leads to an annular space 22 formed between the flanges 3', 3'' of the right-hand valve member 3. The fluid collecting channel 29 communicates with a return conduit 19a which leads the fluid back to the reservoir 28. The inner ends of two radial bores 23, 24 drilled into the body of the valve housing 1 are normally sealed by the annular flanges 2', 2'', respectively, of the valve member 2. The bore 23 communicates with a line 30 leading to one side of the piston 10, i.e. into the lower part of the cylinder 25, and the bore 24 communicates with a second line 31 which leads to the other side of the piston 10, to the upper part of the cylinder 25. Thus, the hydraulic motor B is of the double-acting type in that it may reciprocate the piston 10 in two opposing directions depending upon whether the cylinder 25 receives pressure fluid through the line 30 or 31. The axial length of recesses 4, 5, 6 is greater than the axial length of flanges 2', 2'', and the axial length of these flanges is greater than the diameters of bores 23, 24.

The control valve assembly A operates as follows:

In the initial position of the control assembly, the valve members 2, 3 and the piston 10 are in the positions shown in FIG. 1. If it is desired to move the piston 10 in outward direction (upwardly in FIG. 1), the operator adjusts the position of an actuating member 26a so that the distributor valve 26 admits pressure fluid from a supply conduit 32 (connected to the pressure side of the hydraulic pump 27) to the conduit 17a so that the pressure fluid enters the compartment 16 and shifts the valve member 2 in a direction to the left, i.e. in a direction to compress the resilient element 9 because the right-hand valve member 3 is arrested in the position of FIG. 1 owing to its operative connection with the end portion 11a of the piston rod 11. Thus, the left-hand valve member 2 performs an axial movement in a direction away from the right-hand valve member 3. As the valve member 2 moves away from the valve member 3, the fluid is discharged from the chamber 12 by flowing through the port 13, conduit 13a, distributor valve 26 and a discharge conduit 33 back into the fluid reservoir 28. The flange 2' moves away from the inner end of the bore 23 so that pressure fluid may flow from the pressure conduit 18a, through the inlet port 18, through the annular recess 5 and through the line 30 into the lower part of the cylinder 25 whereby the piston 10 is displaced in upward direction. At the same time, the flange 2'' exposes the inner end of the bore 24 so that the pressure fluid may flow from the upper part of the cylinder 25, through the line 31, through the bore 24, through the annular recess 6, through the outlet port 20, through the collecting channel 29, and through the return conduit 19a back to the reservoir 28. Depending on the extent to which the pressure fluid in compartment 16 shifts the valve member 2 away from the valve member 3, the flanges 2', 2'' will either partially or completely expose the bores 23, 24, respectively.

Figures 3, 4:
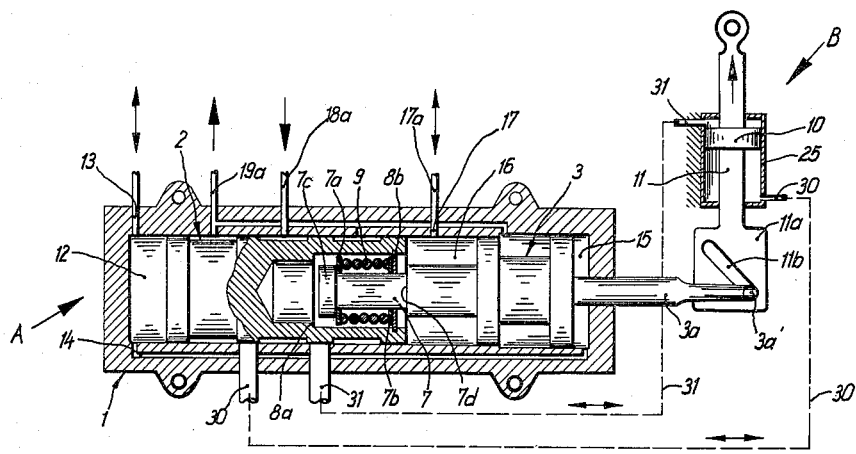
FIG. 3 is a further axial section through the control assembly in a position corresponding to a second end position of the hydraulic motor.
FIG. 4 is a fragmentary sectional view of the control assembly and elevational view of a modified operative connection between the control assembly and a fluid operated system.

However, as the piston 10 moves into the upper end position, its end portion or sliding block 11a causes the right-hand valve member 3 to move in a direction to the right because the follower 3a' is compelled to travel in the inclined cam slot 11b (see FIG. 3). As the valve member 3 performs such movement in a direction to the right, the pressure fluid flows from the chamber 15, through the connecting channel 14 and into the left-hand chamber 12. Because the pressure in the compartment 16 and the bias of spring 9 remain unchanged, the left-hand valve member 2 follows the movement of the valve member 3 in a direction to the right until the flanges 2', 2'' again seal the bores 23, 24, from the annular recesses 5, 6, respectively. Thus, there exists a certain relationship between the movements of the piston 10 and of the valve members 2, 3, the length of the piston stroke in a direction away from the central or neutral position of FIG. 1 depending on the tension of spring 9 and on fluid pressure in the compartment 16, as well as on the inclination and length of the cam slot 11b. The piston 10 is arrested as soon as the flange 2' seals the inner end of the bore 23.

If, and assuming that the piston 10 is in a position somewhere between the positions of FIGS. 1 and 3, the compartment 16 receives additional pressure fluid through the conduit 17a and port 17, the procedure is repeated in that the valve member 2 again moves away from the valve member 3 to expose the inner ends of bores 23, 24 so that the piston 10 may continue its movement toward the upper end position of FIG. 3. Thus, depending on the position of the actuating member 26a which controls the distributor valve 26, the operator may move the piston 10 into any desired number of intermediate positions between the position of FIG. 1 and that which is shown in FIG. 3.

If the operator desires to return the piston 10 into the position of FIG. 1, the actuating member 26a is operated in such a way that it connects the conduit 17a with the discharge conduit 33 so that the spring 9 expels the fluid from the compartment 16, the fluid flowing through the port 17, through the conduit 17a, through the distributor valve 26, and through the discharge conduit 33 back to the reservoir 28. Owing to such movement of the valve member 2 with respect to the momentarily stationary right-hand valve member 3, the flanges 2', 2'' move to the right and away from the inner ends of the bores 23, 24, respectively, whereby the bore 24 may communicate with the annular recess 5 to admit pressure fluid to the line 31 and to the upper part of the cylinder 25, the annular recess 5 being always filled with pressure fluid owing to its communication with the inlet port 18 and pressure conduit 18a which latter leads to the pressure side of the pump 27. The line 30 then communicates with the annular recess 4 which permits discharge of fluid from the lower part of cylinder 25 through the outlet port 19 and return conduit 19a to the reservoir 28. However, as the piston 10 moves back to the position of FIG. 1, it entrains the valve stem 3a and the right-hand valve member 3 in a direction to the left so that the flanges 2', 2" seal the inner ends of bores 23, 24, respectively. The flow of pressure fluid through the line 31 is then arrested and the piston 10 comes to a halt in the position of FIG. 1. The piston remains in such position until the operator again changes the position of the actuating member 26a. Of course, it is assumed that the valve housing 1 is fixed with respect to the cylinder 25.

Figure 2:
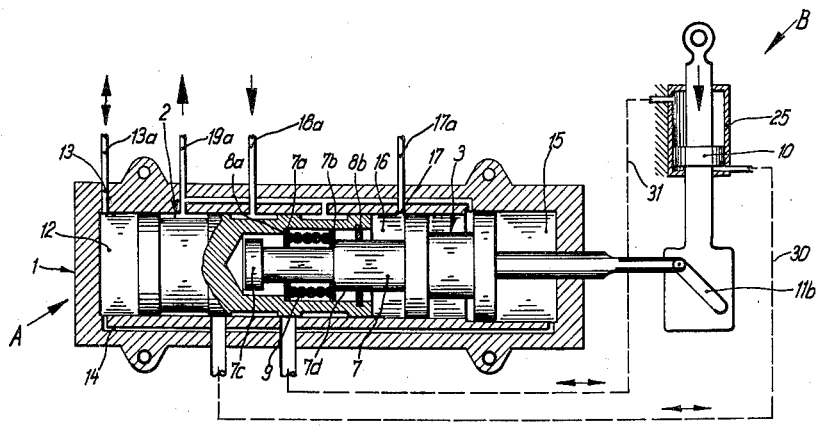
FIG. 2 is a similar section through the control assembly in a position corresponding to a first end position of the hydraulic motor.

If the operator desires to move the piston 10 in inward direction (downwardly) and toward the position of FIG. 2, he operates the actuating member 26a in such manner that the distributor valve 26 admits pressure fluid from the supply conduit 32 into the conduit 13a and through the port 13 into the left-hand pressure chamber 12. The fluid flowing into the chamber 12 compresses the spring 9 because the right-hand valve member 3 is arrested owing to its operative connection with the momentarily stationary piston rod 11. As the valve member 2 moves to the right, its flanges 2', 2" expose the inner ends of bores 23, 24 so that the fluid may flow from the pressure conduit 18a, through the inlet port 18, through the annular recess 5, through the bore 24 and through the line 31 into the upper part of the cylinder 25 whereby the piston moves from the position of FIG. 1 toward the position of FIG. 2 by simultaneously causing the valve member 3 to move in a direction to the left, i.e. toward the valve member 2. The fluid can flow from the lower part of the cylinder 25, through the line 30, through the bore 23, through the recess 4, through the outlet port 19 and through the return conduit 19a back to the reservoir 28. The position of the valve member 2 with respect to the valve member 3 during such movements of the piston 10 from the position of FIG. 1 into the position of FIG. 2 depends upon the pressure of fluid in the chamber 12 and upon the tension of the resilient element 9. As the valve member 3 moves in a direction to the left, it entrains the valve member 2 so that the pressure fluid flows from the chamber 12 through the connecting channel 14 and into the chamber 15, and the flanges 2', 2" again seal the inner ends of bores 23, 24 as soon as the piston 10 reaches its lower end position.

If the operator then desires to return the piston 10 from the position of FIG. 2 into the position of FIG. 1, he operates the actuating member 26a in such a way that the distributor valve 26 permits the discharge of fluid from the chamber 12, the fluid flowing through the port 13, through the conduit 13a and through the discharge conduit 33 back to the reservoir 28. The spring 9 is now free to expand and pushes the valve member 2 in a direction away from the valve member 3 so that the flanges 2', 2" again expose the inner ends of bores 23, 24 in such a manner that the bore 23 communicates with the annular recess 5 and that the bore 24 communicates with the recess 6. The fluid under pressure then flows from the pressure conduit 18a, through the inlet port 18, through the annular recess 5 and through the bore 23 into the line 30 and into the lower part of the cylinder 25 to cause a movement of the piston 10 in upward direction toward the position of FIG. 1. The fluid filling the upper part of the cylinder 25 is free to flow through the line 31, through the bore 24, through the recess 6, through the outlet port 20, through the collecting channel 29 and through the return conduit 19a back to the reservoir 28. The upwardly moving piston 10 entrains the valve member 3 in a direction to the right and causes the flanges 2', 2" of the valve members 2 to seal the bores 23, 24 when the piston reaches the position of FIG. 1.

Thus, by admitting or permitting the discharge of fluid from the compartment 16, and by admitting or permitting the discharge of fluid from the chamber 12, the operator may cause the piston 10 of the hydraulic motor B to move from the neutral position of FIG. 1 into any desired intermediate position or into each of the two end positions (FIGS. 2 and 3). The central annular recess 5 is permanently connected with the pressure source (pump 27), and the two outer annular recesses 4, 6 are permanently connected with the fluid source (outlet ports 19, 20, collecting channel 29 and the return conduit 19a).

It is preferred to install the control valve assembly A in immediate proximity of the controlled system B because such arrangement allows for a very simple construction of the operative connection between the valve member 3 and the hydraulic motor. Thus, the housing 1 of the valve assembly A may be installed directly on the cylinder 25, if desired. It will be readily understood that, especially if the hydraulic motor comprises a reciprocable component (corresponding to the rod 11 and piston 10) which must perform very long working strokes, the operative connection between the valve member 3 and the reciprocable component or components comprises a suitable step-down transmission or the like so that the valve member 3 need not follow a full stroke of the reciprocating component. For example, the connection between the end portion 11a of the reciprocable piston rod 11 and the valve 3 may comprise a bell-crank lever, a pivotally mounted lever whose arms are of different length or any other suitable device which is capable of shifting the valve member 3 a distance which is proportional with the distance covered by the piston rod 11. This modification is shown in FIG. 4 which illustrates a controlled system B' whose piston rod 111 is reciprocable in a direction parallel with the axis of the valve housing 1. The free end of the piston rod 111 is connected with the longer arm of a two-armed lever 34 which is pivotable about a stationary axle 35 and whose shorter arm is connected to the free end of the valve stem 3a. Thus the piston 110 may perform a very long stroke in its cylinder 125 while the valve member 3 will perform a much smaller stroke in the bore 1a of the housing 1. Of course, it is also possible to reverse the position of the operative connection 34 so that the stroke of the reciprocable component 111 will be shorter than the stroke of the valve member 3, this depending upon the nature of work which the controlled system B' must perform. Also, by utilizing an operative connection in the form of a bell crank lever, the controlled system may be mounted for movements at any desired angle with respect to the axis of the valve housing 1.

The control valve assembly is simplified if it operates with a compressed gas because the reservoir 28 and the pump 27 may be replaced by a suitable compressor and the conduits 19a, 33 omitted. The channel 29 then communicates with the atmosphere.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An arrangement of the character described comprising, in combination, a fluid operated system comprising double-acting cylinder means, piston means reciprocably received in said cylinder means for movements between a neutral position and two end positions, piston rod means connected with said piston means and extending from said cylinder means, and first and second fluid line means communicating with said cylinder means at the opposing sides of said piston means; and a control valve assembly comprising a housing rigidly mounted with respect to and located in close proximity of said cylinder means, said housing formed with a bore and having a first and a second end wall, a first valve member having a first end face defining a first pressure chamber with said first end wall, a second end face formed with a blind bore, and four flanges slidably received in the bore of said housing, said flanges defining a first, a second and a third annular recess each surrounding the periphery of said first valve member, a second valve member having an end face defining a second pressure chamber with said second end wall, an extension projecting into said blind bore, and a stem slidably extending through said second end wall, said valve members defining a compartment therebetween, tensioned resilient means for coupling said extension with said first valve member and for constantly biasing said valve members toward each other, stop means for limiting the movements of said valve members under and against the bias of said resilient means, an operative connection between said piston rod means and said valve stem for shifting said second valve member at a rate proportional with the movements of said piston means, a source of pressure fluid, first conduit means connecting said source with said second recess, distributor valve means, second conduit means connecting said source with said valve means, third conduit means connecting said valve means with said first chamber, fourth conduit means connecting said valve means with said compartment, and actuating means for said valve means, said valve means operable to admit fluid from said source to said first chamber and to permit discharge of fluid from said compartment, and vice versa, said housing formed with channel means for connecting said chambers, with outlet port means communicating with said first and third recesses, and with two spaced bores each communicating with one of said line means and each sealable by selected flanges of said first valve member when the piston means is in said neutral position and when no pressure prevails in said first chamber and in said compartment, said first valve member shifted toward and away from said second valve member when fluid is admitted into said first chamber and said compartment, respectively, to move said selected flanges from said bores and to admit fluid from said central recess to one of said line means for moving the piston means in said cylinder means, the other of said line means discharging fluid through one of said first and third recesses and said second valve member following the movements of said piston means and entraining said first valve member to seal said bores when the piston means reaches one of said end positions.

2. An arrangement of the character described, comprising, in combination, a fluid operated system comprising double-acting cylinder means, a piston means reciprocably received in said cylinder means for movements between a neutral position and two end positions, piston rod means connected with said piston means and extending from said cylinder means, and first and second fluid line means communicating with said cylinder means at the opposing sides of said piston means; and a control valve assembly comprising a housing formed with a bore and having a first and a second end wall, a first valve member having a first end face defining a first pressure chamber with said first end wall, a second end face formed with a blind bore, and four flanges slidably received in the bore of said housing, said flanges defining a first, a second and a third annular recess each surrounding the periphery of said first valve member, a second valve member having an end face defining a second pressure chamber with said second end wall, an extension projecting into said blind bore, and a stem slidably extending through said second end wall, said valve members defining a compartment therebetween, tensioned resilient means for coupling said extension with said first valve member and for constantly biasing said valve members toward each other, stop means for limiting the movements of said valve members under and against the bias of said resilient means, an operative connection between said piston rod means and said valve stem for shifting said second valve member at a rate proportional with the movements of said piston means, a source of hydraulic pressure fluid, first conduit means connecting said source with said second recess, distributor valve means, second conduit means connecting said source with said valve means, hydraulic pump means in said second conduit means, third conduit means connecting said valve means with said first chamber, fourth conduit means connecting said valve means with said compartment, and actuating means for said valve means, said valve means operable to admit fluid from said source to said first chamber and to permit discharge of fluid from said compartment, and vice versa, said housing formed with channel means for connecting said chambers, with outlet port means communicating with said first and third recesses, and with two spaced bores each communicating with one of said line means and each sealable by selected flanges of said first valve member when the piston means is in said neutral position and when no pressure prevails in said first chamber and in said compartment, said first valve member shifted toward and away from said second valve member when fluid is admitted into said first chamber, and said compartment, respectively, to move said selected flanges from said bores and to admit fluid from said central recess to one of said line means for moving the piston means in said cylinder means, the other of said line means discharging fluid through one of said first and third recesses and second valve member following the movements of said piston means and entraining said first valve member to seal said bores when the piston means reaches one of said end positions.

References Cited in the file of this patent

UNITED STATES PATENTS

| | | |
|---|---|---|
| 2,922,400 | Lorence | Jan. 26, 1960 |
| 2,958,501 | Pickett et al. | Nov. 1, 1960 |

FOREIGN PATENTS

| | | |
|---|---|---|
| 199,202 | Austria | Aug. 25, 1958 |